US006777830B1

(12) United States Patent
Anderson et al.

(10) Patent No.: US 6,777,830 B1
(45) Date of Patent: Aug. 17, 2004

(54) SYSTEM FOR RELIABLE PREVENTION OF THE RESTARTING OF A MACHINE

(75) Inventors: William Edward Anderson, Cincinnati, OH (US); Donald Louis Wires, Loveland, OH (US); Jürgen Behrens, St. Augustin (DE); Claude Hovine, Archennes (BE); Gernot Müsseler, Alfter (DE); Rolf Dickhoff, Kirchheim/Teck (DE); Winfried Gräf, Esslingen (DE); Udo Ratey, Fislingen/Fils (DE)

(73) Assignees: Pilz GmbH & Company, Ostfildern (DE); Moeller GmbH, Bonn (DE)

( * ) Notice: Subject to any disclaimer, the term of this patent is extended or adjusted under 35 U.S.C. 154(b) by 0 days.

(21) Appl. No.: 09/958,794
(22) PCT Filed: Mar. 17, 2000
(86) PCT No.: PCT/US00/07300
§ 371 (c)(1),
(2), (4) Date: Mar. 6, 2002
(87) PCT Pub. No.: WO00/64026
PCT Pub. Date: Oct. 26, 2000

(51) Int. Cl.[7] ................................................. H02H 3/00
(52) U.S. Cl. ..................................................... 307/326
(58) Field of Search ................................ 307/326, 113, 307/116, 125, 139; 361/1, 23, 115, 170, 189

(56) References Cited

U.S. PATENT DOCUMENTS

| 4,330,810 A | | 5/1982 | Schneider et al. |
| 5,412,528 A | | 5/1995 | Mäder et al. |
| 5,999,395 A | * | 12/1999 | Klees ........................... 361/166 |
| 6,160,323 A | | 12/2000 | Mayr et al. |
| 6,285,096 B1 | * | 9/2001 | Muller et al. ................ 307/326 |
| 6,392,318 B1 | * | 5/2002 | Griffis .......................... 307/125 |

FOREIGN PATENT DOCUMENTS

| DE | 37 06 325 C2 | 9/1988 |
| DE | 0 42 13 171 A1 | 10/1993 |
| DE | 42 23 435 C2 | 11/1993 |
| DE | 44 09 541 A1 | 9/1995 |
| DE | 196 41 516 | 11/1997 |
| DE | 199 09 968 A1 | 9/1999 |
| DE | 199 15 234 C1 | 10/2000 |
| DE | 100 01 735 A1 | 8/2001 |
| EP | 0 600 311 A2 | 6/1994 |
| EP | 0 865 055 A1 | 9/1998 |
| WO | WO 01/53742 A1 | 1/2001 |

OTHER PUBLICATIONS

"Gesteuertes Stillsetzen" in DE–Journal elektro AUTOMATION, 47 Jg, Nr. 12, (Dec., 1994), pp. 54–57.

* cited by examiner

Primary Examiner—Gregory J. Toatley, Jr.
(74) Attorney, Agent, or Firm—Cohen, Pontani, Lieberman & Pavane

(57) ABSTRACT

A safety lock out switch system for the prevention of an unexpected restart of an electrically powered machine in whose main power circuit it is installed. Therein the power-free status of the power supply output of the system is confirmed visually. The system is configured so it is flexible, thus being able to be used in the most various types or sizes of machines. Technical aspects and safety aspects were taken into account therein so that the installation can be carried out in practically every country in the world.

7 Claims, 4 Drawing Sheets

SYSTEM FOR RELIABLE PREVENTION OF THE RESTARTING OF A MACHINE

This application is a U.S. National Phase Application under 35 USC 371 of International Application PCT/US00/07300 (published in English) filed Mar. 17, 2000.

BACKGROUND OF THE INVENTION

The invention relates to a system for the reliable prevention of the restarting of a machine.

For the protection of persons who work on equipment and machines or maintain them particular measures must be provided. There are various legal provisions which lay down the conditions for reliability functions. Widely disseminated is the use of repair switches which are intended to make individual parts of the machine or equipment power-free. However, these show failures even after 20,000 to 50,000 switching cycles and thus represent a potential risk.

In the case of production machines of larger dimensions the repair switches are disposed at points widely separated from one another. This leads to additional problems in monitoring since it cannot be insured that the component to be maintained is actually free of power. Motions causing danger must however be ruled out in the machine.

OBJECTS AND SUMMARY OF THE INVENTION

It is the objective of the invention to provide for a system which reliably prevents the restarting of a machine and which also can be used in spatially extended equipment.

This objective is realized by a system according to claim 1. Preferred embodiments are subject matter of the subclaims.

These are provided according to the invention, at least one disconnect switch which is disposed at the site of the machine at which the machine power is to be switched off, where each disconnect switch issues a disconnect signal to switch off the machine power, a power supply unit connected between the main switch of the main power circuit and the machine, where the main switch is at the power supply input of the power supply unit, and its power output is connected to the machine which maintains the supply of power to the machine interrupted by means of a power connection apparatus if at least one disconnect switch issues a disconnect signal, where a power monitoring apparatus checks the power output of the power supply unit for a voltage-free status, and the power connections apparatus which only permits a restart of the machine when none of the disconnect switches are issuing a disconnect signal; a control unit with a predetermined number of inputs for disconnect switches, or, if necessary, a collection and distribution unit, either of which reports the presence of a disconnect signal at one of its inputs to the power supply unit and receives the status of the power monitoring apparatus of the power supply unit and when the power-free status is reported issues a verification message to the disconnect switch which has supplied the disconnect signal; and, in case the number of disconnect switches is greater than the number of inputs of the control unit, at least one collection and distribution unit which has a predetermined number of inputs for disconnect switches or for an additional collection and distribution unit where at its output a disconnect signal is issued when a disconnect signal is present at one or more inputs.

The system according to the invention is used in particular for the prevention of an unexpected restart of the machine in whose main power circuit it is installed. Therein the power-free status of the power supply output of the system is verified visually. The system is configured so that it is flexible, thus being able to be used in the most various types or sizes of machines. Technical aspects and safety aspects were taken into account therein so that the installation can be carried out in practically every country in the world.

The system according to the present invention is not intended to switch off the system under load, it is not intended to be used as an Emergency Off switch, and it is not intended to be in the position by itself to permit the machine to start up. It is also not intended to replace a main switch. The machine must have its own Start/Stop commands so that an automatic Start is ruled out if the system according to the invention shows power at the power supply output. The system described in this invention, however, will not allow reclosure of the power connection apparatus if a fault is detected until the fault is cleared.

It is possible that individual machine components continue to be excluded from this safety system. This can relate, for example, to heating devices for adhesives and the like whose switching off may destroy parts of its equipment.

In principle forming the power supply unit and the control unit as an integrated component could be provided but as a rule they will be separate components.

The switch-off system of the invention thus comprises four different modules:

disconnect switches which offer the possibility to the operators of safely switching off the electrical power from the machine before they begin their work in a dangerous environment. These switches issue a disconnect signal and receive the (preferably visually displayed) verification of the power-free status, collection and distribution units that collect and concentrate information from the disconnect switches or additional collection and distribution units. For this purpose a unit of this type preferably has a safety device with expansion modules for the transmission of the disconnect signals. The collection and distribution units also transmit the verification signal to the disconnect switch which has issued the disconnect signal.

a control unit which is used as the interface between the power supply unit and the collection and distribution units as well as to the disconnect switches. It is also responsible for the supply of power to the collection and distribution units and the verification message and includes the functionality of a collection and distribution unit. Preferably a monitoring relay, which receives the message concerning the status of the power monitoring apparatus of the power supply unit PB, as well as having a safety circuit which transmits the verification message concerning the power-free status of the power monitoring apparatus to the disconnect switches DS, is provided, more preferably a stabilized DC power source for the monitoring relay, the safety device in the control unit and for the safety device in the collection and distribution units, a non-stabilized DC power source for the verification circuit, and an insulation monitoring circuit for monitoring the insulation between lines which are held at the potential of the stabilized DC power source and lines which are held at the potential of the non-stabilized DC power source, a power supply unit which transmits or disconnects the power for the machine or equipment though the power connection apparatus, a power monitoring apparatus, a control power supply source and, more preferably, a "four-relay" safety circuit.

The control unit as well as the collection and distribution units are the same for all forms of embodiment of the system according to the invention in whatever machine or equipment they are used. The monitoring is done practically independently of the size of the machine since the main circuits only run in the power supply unit.

The minimal configuration of a system according to the invention includes the power supply unit, the control unit, and as well as at least one disconnect switch. The maximal configuration will depend on the number of disconnect switches required as well as on the distance of each collection and distribution unit as well as of each disconnect switch from the control unit.

In normal operation all disconnect switches are closed, that is, none of them issues a disconnect signal. Now if it is intended to provide for a reliable switch-off, the machine must first be stopped. This can, for example, happen through the agency of software by which a stop command is used by the machine. The operator who must work in an area will then switch the corresponding disconnect switch and lock it in the open position. Thereby a disconnect signal is issued which is provided to the power supply unit. On occurrence of the signal it will be checked according to set criteria whether the output of the power supply unit is power-free. When and only when this power-free status is actively confirmed will a verification display on the disconnect switch which has the disconnect signal light up and verify the power-free status. Only then may operators enter into the corresponding area of the machine. As soon as they have finished their work, they will unlock the disconnect switch and once again turn on the equipment. The verification display shuts itself off.

If all the disconnect switches are switched on, the supply of power to the machine is restored and it can be restarted via the Start command.

BRIEF DESCRIPTION OF THE DRAWINGS

In the following the invention is to be explained with the aid of the accompanying drawings. Shown are.

DETAILED DESCRIPTION OF THE DRAWINGS

Figure 1:
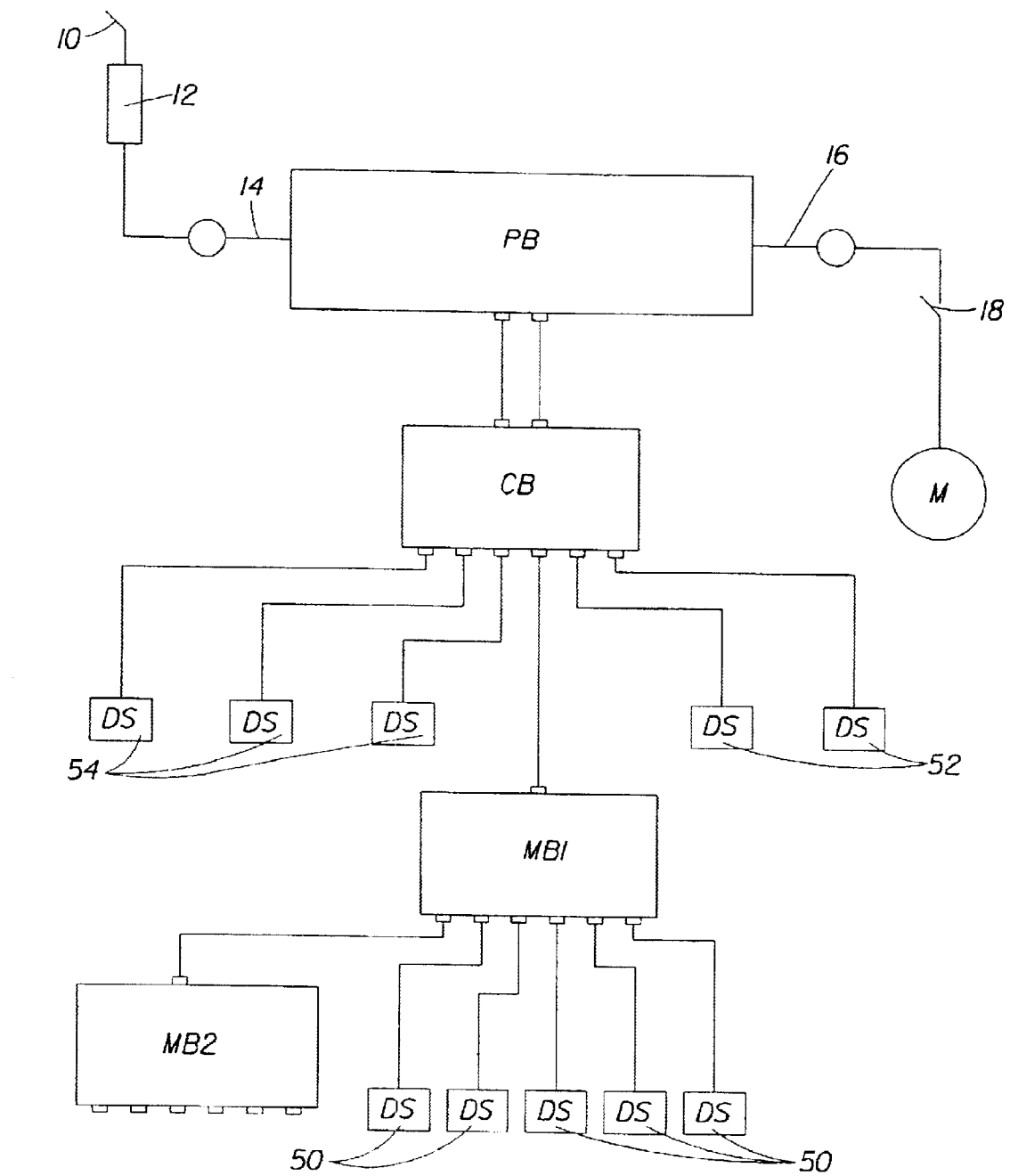
FIG. 1 an example of a configuration of a system according to the present invention, FIG. 2 a schematic representation of a power supply unit PB, FIG. 3 a schematic representation of a control unit CB, FIG. 4 a schematic representation of a collection and distribution unit MB.

FIG. 1 shows a configuration of the system according to the invention with which a machine can be provided which can be switched off at ten sites or machine parts.

Accordingly ten disconnect switches DS are provided. Of the ten disconnect switches DS a first set designated by 50 of disconnect switches DS is conducted to a collection and distribution unit MB1. A sixth input connection of the collection and distribution unit MB1 is allocated to an additional collection and distribution unit MB2 at which once again outputs of disconnect switches could be placed, which however can also be reserved as an option. In a practical development a collection and distribution unit will have six input connections although expansions are also possible. Like the collection and distribution unit MB1 the control unit CB has six inputs of which once again five, taken together designated by 52, 54, are allocated to disconnect switches DS. A sixth input receives the information from the collection and distribution unit MB1. The collection and distribution units as well as the control unit act as concentrators of signals which come from a lower level of the system. They must be disposed so that the drop in voltage between them is minimized and the entire cable length which is required for the connections between the disconnect switches and the power supply unit is optimized. The control unit CB also forms the interface to the power supply unit PB. The power supply unit PB is connected into the main circuit of the equipment or machine. Therein the main switch 10 of the main circuit is secured with a fuse 12 which is at the input 14 of the power supply unit PB. The output 16 of the power supply unit is connected to an additional machine switching device 18 at which the machine M lies. The switching device 18 serves for staring/stopping the machine.

Figure 2:
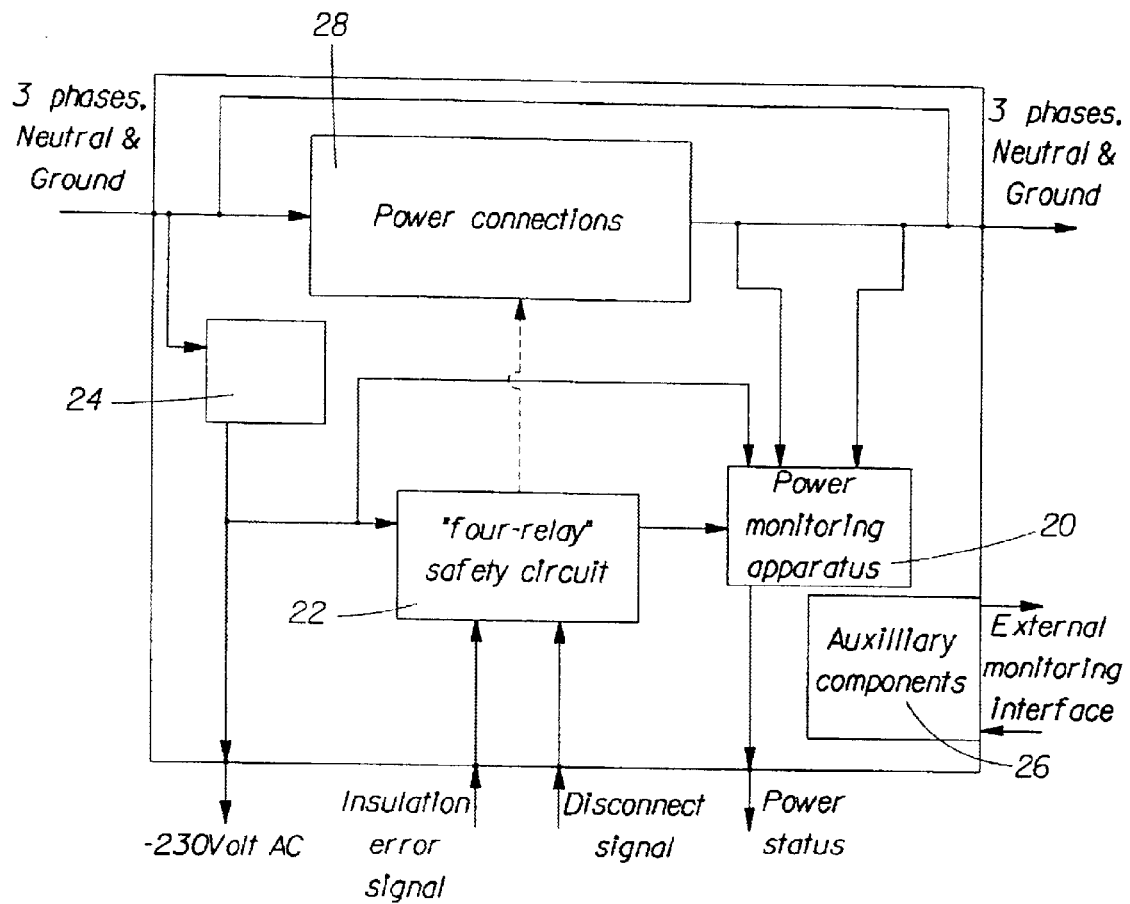
Figure 3:
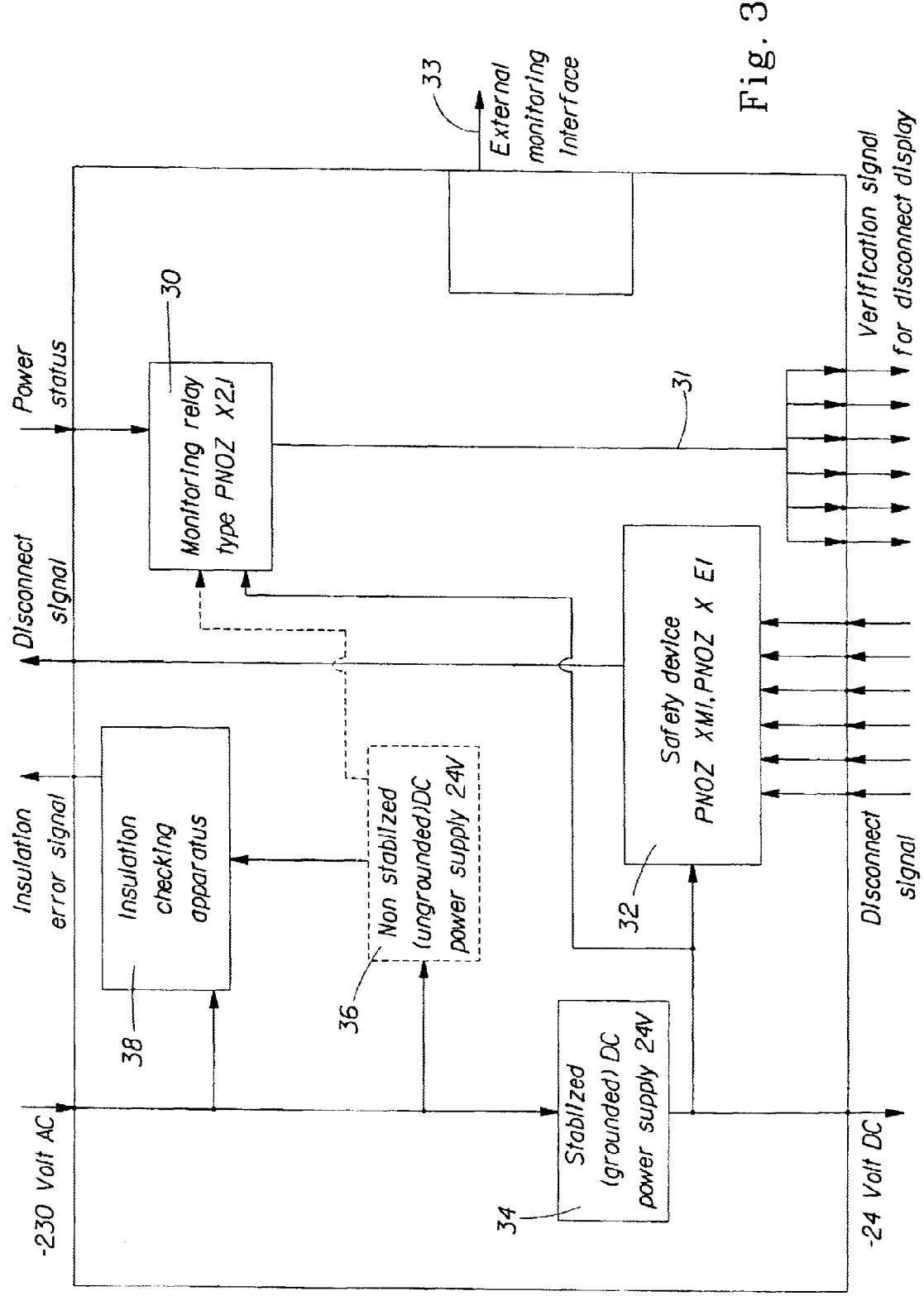
Figure 4:
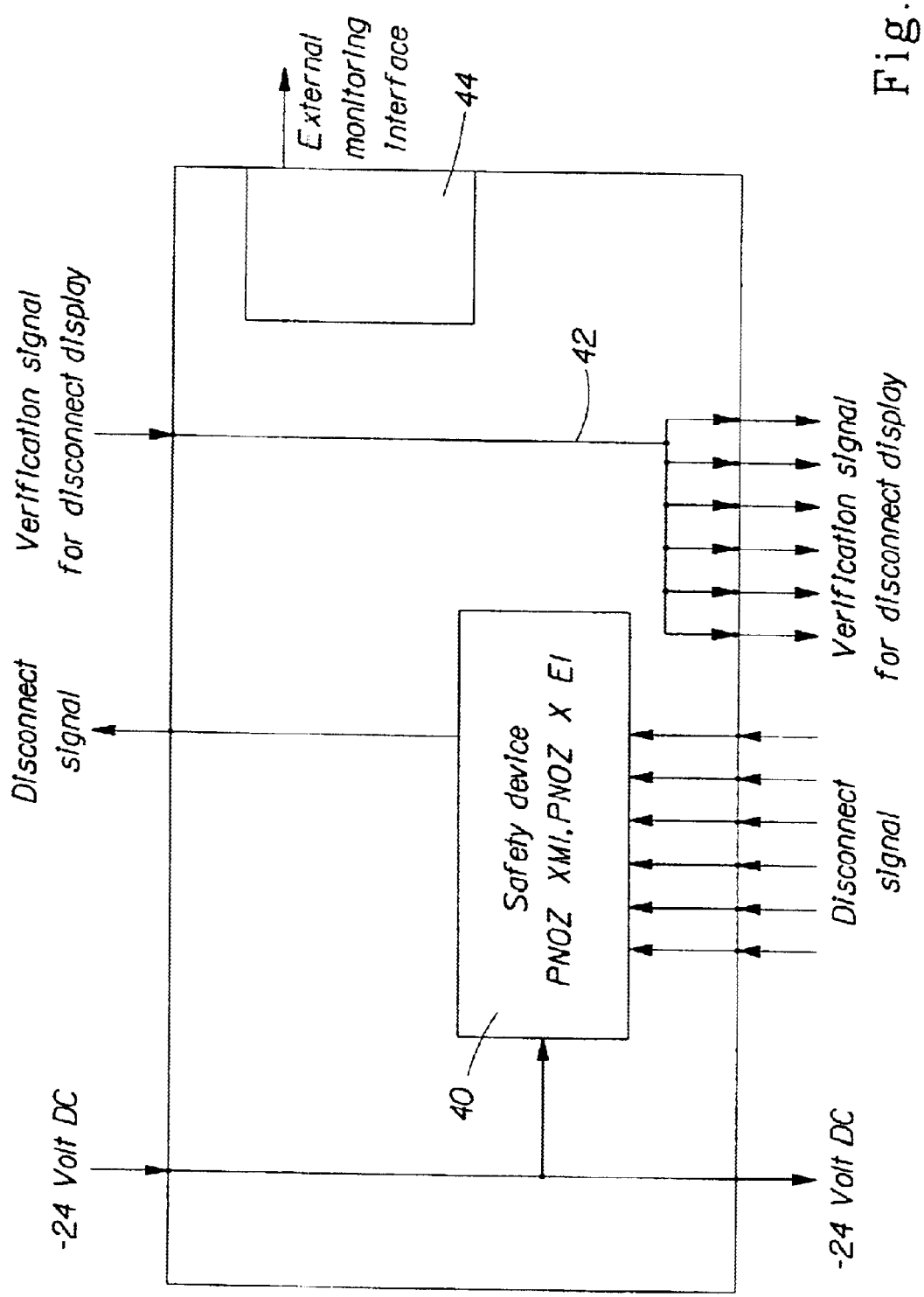

The FIGS. 2 to 4 are highly schematized block circuit images of the individual components among themselves.

FIG. 2 shows in a schematic manner the internal structure of the power supply unit PB. A so-called "four-relay" safety circuit 22, which represents an expanded Emergency Stop switch-off for three phases and alternatively for three phases and a neutral line, has direct access to the power connections apparatus 28. It is the object of the German Patent Application 199 15 234.0 filed in the German Patent Office on Apr. 3, 1999, which is hereby incorporated herein by reference. Another example for an Emergency Stop circuit arrangement is given in DE 196 41 516 C1, which is hereby incorporated herein by reference. The safety circuit 22 reacts to a dual channel disconnect signal and/or to a single channel signal which reports an insulation error, both signals are supplied by the control unit CB (FIG. 3). The power supply unit PB contains furthermore as power monitoring apparatus 20 a safety relay of the type PU3Z of the firm Pilz GmbH & Co. which monitors the power status of the power supply output. Thereby it works as a threshold value circuit and recognizes a phase as power-free if the phase voltage does not exceed a threshold value of 10V relative to the zero line. Provided in addition is a transformer 24 with 230 volt AC power at the output which supplies control power, for the components of the power supply unit, and to the control unit CB (FIG. 3). Dual channel connections are provided to a monitoring relay of the control unit (FIG. 3). Via these the information concerning the power status of the power monitoring apparatus 20 is transmitted, if a disconnect signal is also reported and additional safety criteria are fulfilled. Auxiliary components 26 which are necessary for the proper operation of the power supply unit are not represented in detail, likewise the necessary protective apparatus for the components. Additional connections can be provided for connection to the equipment, likewise connections for a status display as well as a reset switch in the control unit CB.

FIG. 3 shows in a schematic manner the layout of a control unit. The control unit contains a monitoring relay 30 which receives the status of the voltage monitoring apparatus of the power supply unit (FIG. 2). The monitoring relay 30 is, for example, of the type PNOZx2.1 and is also distributed by Pilz GmbH & Co. The control unit further includes a stabilized DC power source 34 with 24 V for a safety device 32 and monitoring relay 30. The control unit further includes a non-stabilized DC power source 36 with 24 V that is controlled by the monitoring relay 30 which, depending on the status of the power monitoring apparatus (FIG. 2), provides for the verification displays on the disconnect circuits connected via the corresponding circuit 31 being lit up or not. So that an erroneous lighting up of these displays is avoided, an insulation checking apparatus 38 is placed between the non-stabilized DC power 24 V lines. This communicates whether the two 24 V circuits are correctly separated from one another, i.e., there are no isolation defects. If an error is recognized, the restart of the SLS is disabled until the insulation checking apparatus 38 is reset. The reset switch of the control unit CB will be able to reset the insulation checking apparatus 38 only if the insulation fault has disappeared. Additional testing apparatuses within the control unit and for the supply lines can be provided. The control unit has six input connections whose present signals are processed in the safety device 32 as in a collection and distribution unit (FIG. 4). The result of the processing is given as a dual channel disconnect signal to the four-relay safety circuit 22 (FIG. 2). Conversely dual channel connections serve as connection of the monitoring relay 30 to the power monitoring apparatus of the power unit, e.g. connection power status (FIGS. 2 and 3). Two signal lamps are provided, one which lights up if the system is ready to operate, the other if one of the disconnect switches is open. Additional connections for the connection to the machine can be provided. Via an interface 33 the external monitoring is possible.

FIG. 4 shows the schematic layout of a collection and distribution unit. Like the control unit it has six inputs as well as an output for disconnect signals. A safety device 40, which, for example, can be configured from safety relays with expansion modules according to need, processes the disconnect signals and passes the result to the next step of the system. Conversely the collection and distribution unit also provides for the verification signals being supplied to the corresponding disconnect circuits via circuits 42 provided therefor connecting the corresponding disconnect signal lamp. As an example safety device, a relay PNOZXM1 is suitable which is provided with expansion modules PNOZXE1, both once again by Pilz GmbH & Co. Via an interface 44 external monitoring is possible.

Preferably by the redundant design of the system according to the invention an increased reliability is achieved. Over the entire system a two-channel interrogation is done, for example of the status of the disconnect signal, in particular the "four-relay" safety circuit in the power supply unit has a double channel input.

The characteristics of the invention disclosed in the description above, in the drawings, as well as in the claims can be material individually as well as in arbitrary combination for the actualization of the invention.

What is claimed is:

1. A system for reliable prevention of unexpected start-up of a machine, characterized by
   at least one disconnect switch (DS) which is disposed at the site of the machine (M) at which, the output of the power supply unit (16) is actively confirmed to be power free, and where the verification message is permitted to be displayed only at each disconnect switch (DS) which issues a disconnect signal, if the machine power is switched off and if the output of the power supply unit is actively confirmed to be power free, the machine power is switched off,
   a power supply unit (PB) connected between the main switch (10) of the main circuit and the machine (M) where the main switch (10) is at the input of the power supply unit (14) and the output of the power supply unit (16) is connected to the machine (M), which power unit (PB) maintains the supply of the power to the machine, operated through (28) the power connections apparatus interrupted if at least one disconnect switch (DS) issues a disconnect signal where the power monitoring apparatus (20) checks the power output (16) of the power supply unit (PB) for a power-free status and which power supply unit permits a restart of the machine (M) if and only if none of disconnect switches (DS) is issuing a disconnect signal,
   a control unit (CB) with a predetermined number of inputs for disconnect switches (DS) or for a collection and distribution unit (MB), which reports the presence of a disconnect signal at one of its inputs to the power supply unit (PB) and receives the status of the power monitoring apparatus (20) of the power supply unit (PB) and, when the power-free status is reported, issues a verification message to the disconnect switch (DS) which has supplied the disconnect signal;
   and, if the number of disconnect switches (DS) is larger than the number of inputs of the control unit (CB), at least one collection and distribution unit (MB) having a predetermined number of inputs for disconnect switches (DS) or for a further collection and distribution unit (MB), wherein a disconnect signal is issued at its output when a disconnect signal is supplied at least at one input.

2. System according to claim 1 characterized by the fact that the power supply (PB) and control unit (CB) are separate components.

3. System according to claim 1 characterized by the fact that the control unit (CB) has a monitoring relay (30) which receives the message concerning the status of the power monitoring apparatus (20) of the power supply unit (PB) as well as a verification display circuit (31) which transmits the activation message concerning the power-free status of the power monitoring apparatus (20) to the corresponding disconnect switches (DS).

4. System according to claim 3 characterized by
   a stabilized DC power source (34) for the monitoring relay
   a non-stabilized DC power source (36) for the verification circuit and
   an insulation checking apparatus (38) for monitoring the insulation between lines which are maintained at the potential of the stabilized (insulated from ground) DC power source (34) and lines which are maintained at the potential of the non-stabilized (one line grounded) DC power source (36).

5. System according to claim 1 characterized by the fact that the collection and distribution unit (MB) has a safety device (40) for the transmission of the disconnect signals.

6. System according to claim 1 characterized by the fact that all the disconnect signal lines are designed as dual-channel lines and that the power monitoring apparatus (20) and verification display circuit (31, 42) as well as safety device with the expansion modules (40) are such with redundant measurement circuits and/or circuits.

7. System according to claim 1 characterized by the fact each disconnect switch (DS) has a signal lamp for the display of the verification message.

* * * * *

UNITED STATES PATENT AND TRADEMARK OFFICE
CERTIFICATE OF CORRECTION

PATENT NO. : 6,777,830 B1
DATED : August 17, 2004
INVENTOR(S) : William Edward Anderson It is certified that error appears in the above-identified patent and that said Letters Patent is hereby corrected as shown below:

Column 1,
Lines 4-6, should read as follows:
-- This application is a U.S. National Phase Application under 35 USC 371 of International Application PCT/US00/07300 filed March 17, 2000, which claims priority of International Application PCT/US99/08322 filed April 15, 1999. --.

Signed and Sealed this

Twenty-third Day of August, 2005

JON W. DUDAS
*Director of the United States Patent and Trademark Office*